(12) United States Patent
Williams

(10) Patent No.: US 12,511,111 B1
(45) Date of Patent: Dec. 30, 2025

(54) SYSTEMS AND METHODS FOR ADVANCED OVER-THE-AIR SOFTWARE UPDATES

(71) Applicant: State Farm Mutual Automobile Insurance Company, Bloomington, IL (US)

(72) Inventor: Aaron Williams, Congerville, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 116 days.

(21) Appl. No.: 18/174,399

(22) Filed: Feb. 24, 2023

Related U.S. Application Data

(60) Provisional application No. 63/483,883, filed on Feb. 8, 2023.

(51) Int. Cl.
*G06F 8/65* (2018.01)
*G06F 8/71* (2018.01)
*G06Q 10/0635* (2023.01)
*G06Q 40/08* (2012.01)

(52) U.S. Cl.
CPC .................. *G06F 8/65* (2013.01); *G06F 8/71* (2013.01); *G06Q 10/0635* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 8,433,344 B1 | 4/2013 | Virga | |
| 8,712,805 B1 | 4/2014 | Ferries et al. | |
| 9,513,898 B2 * | 12/2016 | Solnit | G09C 1/00 |
| 9,946,531 B1 * | 4/2018 | Fields | B60K 35/00 |
| 9,993,890 B2 * | 6/2018 | Denis | H04L 67/125 |
| 10,055,793 B1 | 8/2018 | Call et al. | |
| 10,062,118 B1 | 8/2018 | Bernstein et al. | |
| 10,229,394 B1 | 3/2019 | Davis et al. | |
| 10,623,509 B2 | 4/2020 | Delinselle et al. | |
| 10,672,081 B1 | 6/2020 | Lyons et al. | |
| 10,699,346 B1 | 6/2020 | Corder et al. | |
| 10,841,791 B1 * | 11/2020 | Zhang | H04W 72/51 |
| 10,861,115 B1 | 12/2020 | Stricker et al. | |
| 10,930,089 B1 * | 2/2021 | Leise | H04L 9/30 |

(Continued)

FOREIGN PATENT DOCUMENTS

| | | |
|---|---|---|
| AU | 2015100551 A4 | 5/2015 |
| WO | 2018052595 A1 | 3/2018 |

OTHER PUBLICATIONS

Safi, "A Survey on IoT Profiling, Fingerprinting, and Identification", 2022, ACM (Year: 2022).*

(Continued)

*Primary Examiner* — Hossain M Morshed

(74) *Attorney, Agent, or Firm* — Armstrong Teasdale LLP

(57) ABSTRACT

A system for controlling over-the-air updates for a device (i) stores a plurality of version and setting information for plurality of devices; (ii) receives version and setting information for the first device of the plurality of devices; (iii) stores the version and setting information for the first device; (iv) determines a risk profile for the first device based upon the corresponding version and setting information; and (v) determines an insurance quote based upon the risk profile for the first device.

20 Claims, 9 Drawing Sheets

(56) References Cited

U.S. PATENT DOCUMENTS

| | | |
|---|---|---|
| 11,003,334 B1 | 5/2021 | Conway et al. |
| 11,037,255 B1 | 6/2021 | Ganev et al. |
| 11,055,797 B1 | 7/2021 | Carone |
| 11,087,347 B1 | 8/2021 | De Guia et al. |
| 11,087,420 B1 | 8/2021 | Trundle |
| 11,210,741 B1 | 12/2021 | Allen et al. |
| 11,501,100 B1 | 11/2022 | Geng et al. |
| 11,582,595 B2 * | 2/2023 | Parra-Yepez .......... H04W 8/22 |
| 11,656,097 B2 | 5/2023 | Vega et al. |
| 11,748,817 B2 | 9/2023 | Szott |
| 2008/0255862 A1 | 10/2008 | Bailey et al. |
| 2011/0270773 A1 | 11/2011 | Siekman et al. |
| 2011/0295624 A1 | 12/2011 | Chapin et al. |
| 2012/0072239 A1 | 3/2012 | Gibbard et al. |
| 2015/0061859 A1 | 3/2015 | Matsuoka et al. |
| 2015/0088550 A1 * | 3/2015 | Bowers .................. G06Q 40/08 705/4 |
| 2016/0048934 A1 | 2/2016 | Gross |
| 2016/0055594 A1 | 2/2016 | Emison et al. |
| 2016/0275633 A1 | 9/2016 | Gitt et al. |
| 2016/0321587 A1 | 11/2016 | Gitt et al. |
| 2017/0124660 A1 * | 5/2017 | Srivastava ............. G06Q 40/08 |
| 2018/0033087 A1 | 2/2018 | Delinselle et al. |
| 2019/0251520 A1 | 8/2019 | Bentley, III et al. |
| 2019/0327663 A1 | 10/2019 | Wirth |
| 2021/0011448 A1 | 1/2021 | Coleman et al. |
| 2021/0018335 A1 | 1/2021 | Hood |
| 2021/0019847 A1 | 1/2021 | Sneed |
| 2021/0051000 A1 * | 2/2021 | Yang .................... H04L 63/123 |
| 2021/0150651 A1 | 5/2021 | Shoup |
| 2021/0182986 A1 | 6/2021 | Butler et al. |
| 2021/0279791 A1 | 9/2021 | Jacoby |
| 2021/0295439 A1 * | 9/2021 | Konrardy ............... G06F 30/20 |
| 2021/0350471 A1 | 11/2021 | Hakimi-Boushehri et al. |
| 2022/0075707 A1 | 3/2022 | Degaonkar et al. |
| 2022/0263915 A1 * | 8/2022 | Yang .................... H04L 41/082 |
| 2022/0343443 A1 | 10/2022 | Graham et al. |
| 2022/0383421 A1 | 12/2022 | Grivel et al. |
| 2022/0391794 A1 | 12/2022 | Singh et al. |
| 2023/0035517 A1 | 2/2023 | Bentley, III et al. |
| 2024/0119535 A1 * | 4/2024 | Kloeppel ........... G06Q 30/0201 |
| 2024/0127193 A1 * | 4/2024 | Williams ............... G06Q 40/06 |

OTHER PUBLICATIONS

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

* cited by examiner

SYSTEMS AND METHODS FOR ADVANCED OVER-THE-AIR SOFTWARE UPDATES

RELATED APPLICATION

This application claims priority to U.S. Provisional Patent Application No. 63/483,883, filed Feb. 8, 2023, the contents of which are hereby incorporated by reference, in their entireties and for all purposes, herein FIELD OF INVENTION The field of the invention relates generally to over-the-air updates, and more specifically, to tracking over the air updates to devices and the associated attributes and/or parameters of those devices based upon the over the air updates.

BACKGROUND

Once a device has been manufactured and sold, it may be difficult for the manufacturer to make changes to the device. However, as more and more new Internet-connected devices are being produced, over-the-air updates may become the standard method for updating these devices. Using over-the-air updates, Internet connected devices, such as Internet of Things (IoT) devices, may have their software remotely updated. These updates may occur to fix bugs and/or glitches in the software, add new features for the device, and/or update the security of the device.

As these updates are being applied to devices, it may be difficult to know which attributes are being used. Furthermore, some of these devices may have multiple modes and/or options that can be selected by the user. Accordingly, it would be useful to have a way to monitor the changes to these devices to know which options, attributes, parameters, and/or modes are being used by the devices and thus provide an overview of how the corresponding device is operating. Conventional techniques may have additional inefficiencies, encumbrances, ineffectiveness, and/or drawbacks as well.

BRIEF DESCRIPTION

The present embodiments may relate to, inter alia, network-based systems and methods for controlling over-the-air software updates for a first device. A software update monitoring system, as described herein, may include an update monitoring ("UM") computer device that is in communication with a user computer device. The UM computer device may be configured to (1) store a plurality of version and setting information for plurality of devices; (2) receive version and setting information for the first device of the plurality of devices; (3) store the version and setting information for the first device; (4) determine a risk profile for the first device based upon the corresponding version and setting information; (5) determine an insurance quote based upon the risk profile for the first device; and/or (6) provide the insurance quote to the user.

The UM computer device may be configured to: (i) determine that a more recent version is available for the first device; (ii) transmit a message to the user of the first device to inform the user about the more recent version; and/or (iii) transmit the more recent version to the first device, wherein the first device is configured to install the more recent version. The UM computer device may be further configured to: (1) receive an update to the version and setting information for the first device; (2) update the risk profile for the first device based upon the updated version and setting information; (3) determine an updated insurance quote based upon the updated risk profile for the first device; (4) receive the update in response to a request to the first device; and/or (5) receive the update to the version and setting information on a periodic basis.

In one aspect, a computer system for controlling over-the-air software updates for a first device may be provided. The computer system may include one or more local or remote processors, transceivers, servers, sensors, memory units, wearables, mobile devices, smart contacts, smart glasses, smart watches, augmented reality glasses, virtual reality headsets, voice bots, chat bots, ChatGPT bots, and/or other electronic or electrical components, which may be wired or wireless communication with one another. For example, in one instance, the system may include at least one processor (and/or associated transceiver) in communication with at least one memory device. The at least one processor may be configured or programmed to: (1) store a plurality of version and setting information for plurality of devices; (2) receive version and setting information for the first device of the plurality of devices; (3) store the version and setting information for the first device; (4) determine a risk profile for the first device based upon the corresponding version and setting information; and/or (5) determine an insurance quote based upon the risk profile for the first device. The computer system may have additional, less, or alternate functionality, including that discussed elsewhere herein.

In another aspect, a computer-based method for controlling over-the-air software updates for a first device may be provided. The computer-based method may be implemented via one or more local or remote processors, transceivers, sensors, servers, memory units, mobile devices, wearables, smart glasses, smart contacts, smart watches, augmented reality glasses, virtual reality headsets, voice bots, chat bots, ChatGPT bots, and/or other electronic or electrical components, which may be wired or wireless communication with one another. For example, in one instance, the method may be implemented on an update monitoring ("UM") server that includes at least one processor (and/or associated transceiver) in communication with at least one memory device. The method may include, via the at least one processor: (1) storing a plurality of version and setting information for plurality of devices; (2) receiving version and setting information for the first device of the plurality of devices; (3) storing the version and setting information for the first device; (4) determining a risk profile for the first device based upon the corresponding version and setting information; and/or (5) determining an insurance quote based upon the risk profile for the first device. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions cause the processor to: (1) store a plurality of version and setting information for plurality of devices; (2) receive version and setting information for the first device of the plurality of devices; (3) store the version and setting information for the first device; (4) determine a risk profile for the first device based upon the corresponding version and setting information; and/or (5) determine an insurance quote based upon the risk profile for the first device. The computer-executable instructions may direct additional, less, or alternate functionality, including that discussed elsewhere herein.

In one aspect, a computer system for controlling over-the-air software updates for a first device may be provided. The computer system may include one or more local or remote processors, transceivers, servers, sensors, memory units, wearables, mobile devices, smart glasses, smart contact lenses, smart watches, augmented reality glasses, virtual reality headsets, voice bots, chat bots, ChatGPT bots, and/or other electronic or electrical components, which may be in wired or wireless communication with one another. For example, in one instance, the system may include at least one processor (and/or associated transceiver) in communication with at least one memory device. The at least one processor may be configured or programmed to: (1) store a plurality of version and setting information for plurality of devices; (2) receive version and setting information for the first device of the plurality of devices; (3) store the version and setting information for the first device; (4) determine an insurance policy associated with the first device; and/or (5) update the insurance policy based upon the version and setting information for the first device. The computer system may have additional, less, or alternate functionality, including that discussed elsewhere herein.

In another aspect, a computer-based method for controlling over-the-air software updates for a first device may be provided. The computer-based method may be implemented via one or more local or remote processors, transceivers, sensors, servers, memory units, mobile devices, wearables, smart glasses, smart watches, smart contacts, augmented reality glasses, virtual reality headsets, voice bots, chat bots, ChatGPT bots, and/or other electronic or electrical components, which may be in wired or wireless communication with one another. For example, in one instance, the method may be implemented on an update monitoring ("UM") server that includes at least one processor (and/or associated transceiver) in communication with at least one memory device. The method may include, via the at least one processor: (1) storing a plurality of version and setting information for plurality of devices; (2) receiving version and setting information for the first device of the plurality of devices; (3) storing the version and setting information for the first device; (4) determining an insurance policy associated with the first device; and/or (5) updating the insurance policy based upon the version and setting information for the first device. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions cause the processor to: (1) store a plurality of version and setting information for plurality of devices; (2) receive version and setting information for the first device of the plurality of devices; (3) store the version and setting information for the first device; (4) determine an insurance policy associated with the first device; and/or (5) update the insurance policy based upon the version and setting information for the first device. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
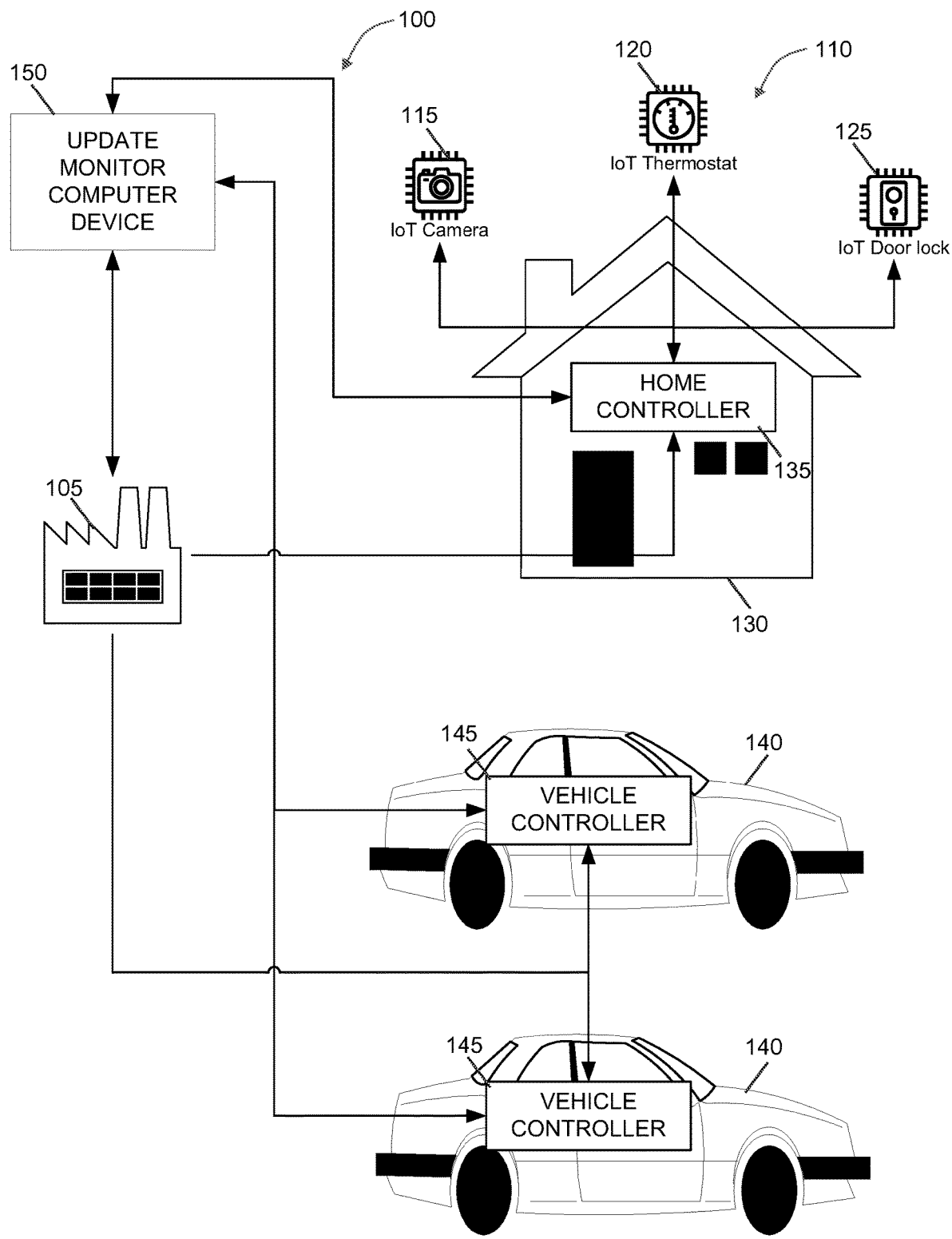
FIG. 1 illustrates an exemplary computer system of monitoring and controlling over-the-air updates for devices, in accordance with at least one embodiment of this disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for tracking over-the-air updates and, more particularly, to a network-based system and method for tracking over the air updates to computing devices and the associated attributes and/or parameters of those devices based upon the over the air updates. An update monitoring system, as described herein, may include an update monitoring ("UM") computer device that is in communication with a plurality of client computing devices to be monitored.

In one exemplary embodiment, the process is performed by the UM computer device, also known as an update monitoring ("UM") server. In the exemplary embodiment, the UM server monitors the current versions and settings associated with the plurality of client devices. The version and settings may include, but is not limited to, software versions, firmware versions, driver versions, modes, settings, parameters, options, and attributes of each of the client devices. These versions and settings allows the UM computer device to determine one or more risks associated with the devices based upon at least certain historical information gathered relating to these versions and device settings. The UM computer device can then use the one or more risks to determine a risk profile and then a cost for insuring the device. The UM computer device can update the risks and risk profile to update the cost for insuring the device when the risks and/or risk profile change.

In the exemplary embodiment, a manufacturer provides one or more internet connected devices, also known as Internet of Things (IoT) devices. These devices may be in or around a home. The devices may include, but are not limited to IoT cameras, IoT thermostats, IoT door locks, and/or any other Internet connected device, such as a mobile device, including, but not limited to, a laptop and/or a mobile phone, one or more voice or chat bots, a computer device, including, but not limited to, a desktop computer and/or a router, and/or a home controller. In at least one embodiment, the home controller is in wired or wireless communication with the one or more devices in the home. In some embodiments, the home controller may be a router or Wi-Fi providing device in the home. In other embodiments, the home controller is a smart home controller that controls one or more of the devices and may provide communication between the user and the individual devices.

In at least one embodiment, each device includes a plurality of settings, attributes, parameters, and/or configurations that allow the device to operate in different ways and provide different operations to the user. These settings, attributes, parameters, and/or configurations may be set, modified, and/or changed by the user. The user may be the homeowner and/or the owner of the individual devices. These settings, attributes, parameters, and/or configurations may relate to the security of the device, how the device behaves in different situations, who may access the device, who may make changes to the device and its settings, attributes, parameters, and/or configurations, and/or other options related to the device.

Some of these settings, attributes, parameters, and/or configurations may provide more security and/or safety as to how the device is used. For example, a smart oven with an automatic shutoff after four hours may be considered safer than a smart oven with an automatic shutoff set at twelve hours.

In another example, an IoT door lock that has only one connected device to unlock it would be more secure than an IoT door lock with multiple connected devices that can unlock it. In a further example, a home controller that is configured to communicate using the wired equivalent privacy (WEP) encryption protocol would be considered less safe and secure than using Wi-Fi Protected Access (WPA) encryption protocol, or the Wi-Fi Protected Access Version 2 (WPA2) encryption protocol. In another example, an IoT device that requires two-factor authentication before changing settings would be more secure and safe than one that only requires a password and/or one that allows anyone on the network to access and make changes to the device.

In at least one embodiment, the manufacturer may provide one or more software and/or firmware updates for the devices. The software and/or firmware updates may provide additional modes, options, and/or configurations to the devices. In some of these embodiments, the device is registered with the manufacturer and the manufacturer uses a website to push the update to the device, where the update is automatically applied to the device. In other embodiments, the device requests any updates from the website of the manufacturer, such as on a periodic basis or when prompted to by the user. These two styles of updates may be considered "over-the-air" updates. In a third embodiment, a user may download the update from a website associated with the manufacturer and apply the update to the device.

In the exemplary embodiment, vehicles may also have software that is executed by one or more vehicle controllers in the vehicle. The vehicle controller may control various operations of the vehicle, including, but not limited to, infotainment and/or vehicle operation. In some embodiments, the vehicle controller is in communication with and/or is a part of the car area network (CAN) bus. The CAN bus provides commands to various devices that operate different portions of the vehicle. These devices may control breaking, acceleration, turning, fuel economy, suspension, and/or other operations of the vehicle.

In this embodiment, the vehicle controller may be provided with "over-the-air" updates to the software for the vehicle controller itself and the other operational devices in the vehicle. For example, one update to the vehicle may change the braking profile of the vehicle to cause it to change how the brakes are applied in different situations. This software may also allow the user to have different profiles for operation of the vehicle. For example, the vehicle may have a sport operation mode, a towing operation mode, a comfort operation mode, and/or a safety operation mode. Each operation mode may change one or more parameters of the vehicle and how the vehicle operates. For example, the sports mode may have an increased acceleration where the vehicle accelerates faster when the driver presses the gas pedal or when the vehicle controller controls the vehicle.

In the exemplary embodiment, the updates to the devices and the vehicles may be tracked by an update monitoring (UM) computer device. In some embodiments, the UM computer device may be in communication with the devices and/or the vehicles. In further embodiments, the UM computer device may be in communication with one or more websites associated with the manufacturer. Through these communications, the UM computer device may determine which version of the software, firmware, and/or updates have been applied to the devices and/or vehicles. The UM computer device may also determine which parameters, attributes, settings, options, modes, and/or preferences have been set and to what.

In some of these embodiments, the devices and/or vehicles are configured to transmit their current update versions and settings to the UM computer device. In other embodiments, the UM computer device transmits a request to the devices and/or vehicles to request the update and setting information.

In still further embodiments, the manufacturer may have a website and/or application that facilitates the user interactions with the devices and/or vehicle. The manufacturer's website and/or application may track the update versions and/or settings applied to the devices and/or vehicle and report those versions and settings to the UM computer device.

In some embodiments, the UM computer device receives the updates for the devices and/or the vehicles from the manufacturer and provides those updates to the devices and/or vehicles to ensure the devices and/or the vehicles are up to date.

In one or more embodiments, the UM server is in communication with one or more insurance servers. The insurance servers may provide insurance to the users of the devices for the devices. The insurance servers may receive the version and setting information from the UM server for the variously insured devices. The insurance server may also set insurance values and/or premiums on those devices based upon the versions and/or setting information. Furthermore, in some embodiments, the insurance server may receive periodic setting and version information from the UM server, and make adjustments to the corresponding insurance based upon the provided information. In some embodiments, the insurance server may request the current version and setting information for one or more devices. In other embodiments, the insurance server may provide one or more suggestions for settings to the user to improve their insurance rates. In at least one embodiment, the insurance server may provide a monthly report on the insurance rates to the user based upon their version and setting information for their covered devices.

In some embodiments, the UM server determines a risk profile for a first device based upon the corresponding version and setting information. In at least some embodiments, the risk profile may be determined by the insurance server and provided to the UM server. In additional embodiments, the risk profile represents an overall riskiness or probability of an insurance claim being made based upon the versions, parameters, attributes, settings, options, modes, and/or preferences associated with the first device. In some embodiments, the UM server may include one or machine learning based models to determine the risk profile for the current version and setting information of the first device based upon historical information about the first device. In some of these embodiments, some or all of the historical information may be provided by one or more insurance servers. In other embodiments, the UM server may provide the version and update information to the insurance server, wherein the insurance server includes one or machine learning based models to determine the risk profile for the current version and setting information of the first device based upon historical information about the first device.

In some embodiments, the UM server compares a plurality of historical data, such as those included in claims, to determine risks associated with different versions and settings in different devices. The UM server may determine which settings are higher risk than others. For example, in an analysis of vehicular claims, the UM server may determine which settings may be more likely to prevent an accident and which may be more likely to be associated with one. In different IoT devices, the UM server may determine which settings are safer, such as shutting off an oven after 4 hours versus 12 hours. The UM server may also review cybersecurity reports and determine which settings and/or versions would make the device more secure from malicious actors.

In some embodiments, the UM server may automatically update settings and/or versions of devices. In other embodiments, the UM server may prompt the user to ask if they wish to update the settings and/or versions.

In still further embodiments, the UM server may store a plurality of risk profiles and their associated costs and settings and versions. The UM server may determine a first risk profile for the current settings and/or version of the device. The UM server may then compare that first risk profile with other predetermined risk profiles. The UM server may then notify the user of the different cost differences of the different settings and/versions in the device. This may prompt the user to update the settings and/or versions based on the associated cost of insurance. For example, the UM server may indicate that the sport mode of the vehicle may cost a dollar a day more than the default mode. The UM server may further indicate that the safe mode costs two dollars less than the default mode for the vehicle. The UM server may also indicate a cost for individual settings, such as acceleration and/or braking profiles. The UM server may illustrate the cost savings to the user of changing each setting to a lower risk setting.

In some embodiments, the user may permit the UM server to automatically update settings and/or version to the lowest cost ones. In some of these embodiments, the UM server prompts the user before updating the settings and/or versions.

In some embodiments, the UM server may determine an insurance quote based upon the risk profile for the first device. In other embodiments, the UM server may generate an insurance policy for the first device based upon the risk profile.

In some embodiments, the UM server may receive an update to the version and setting information for the first device. The UM server may update the risk profile for the first device based upon the updated version and setting information. The UM server may then determine an updated insurance quote and/or policy based upon the updated risk profile for the first device. In some of these embodiments, the update to the version and setting information includes a change to a single setting. In additional embodiments, the UM server receives the update in response to a request to the first device. In other embodiments, the UM server receives the update to the version and setting information on a periodic basis.

In some embodiments, the UM server determines an insurance policy associated with the first device. Then the UM server updates the insurance policy associated with the first device based upon the version and setting information. The UM server may update the insurance policy based upon the risk profile.

At least one of the technical problems addressed by this system may include: (i) improving safety of IoT devices and vehicles; (ii) improving security of IoT devices and vehicles; (iii) improving the update process for devices and vehicles; and (iv) improving the accuracy of risk profiles for devices and vehicles.

The methods and systems described herein may be implemented (i) using computer programming or engineering techniques including computer software, firmware, hardware, or any combination or subset thereof, and/or (ii) by using one or more local or remote processors, transceivers, servers, sensors, servers, scanners, AR or VR headsets or glasses, smart glasses, smart contacts, voice bots, chat bots, ChatGPT bots, and/or other electrical or electronic components, wherein the technical effects may be achieved by performing at least one of the following steps: (1) store a plurality of version and setting information for plurality of devices; (2) receive version and setting information for the first device of the plurality of devices; (3) store the version and setting information for the first device; (4) determine a risk profile for the first device based upon the corresponding version and setting information; and/or (5) determine an insurance quote based upon the risk profile for the first device.

Exemplary System for Monitoring and Updating Devices

FIG. 1 illustrates an exemplary system 100 of monitoring and controlling over-the-air updates for devices, in accordance with at least one embodiment of this disclosure. System 100 illustrates monitoring devices to know the updates, versions, attributes, parameters, configurations, and preferences for each device. In some embodiments, system 100 assists in updating the devices.

In the exemplary embodiment, a manufacturer 105 provides one or more internet connected devices 110, also known as Internet of Things (IoT) devices 110. These devices 110 may be in or around a home 130. The devices 110 may include, but are not limited to IoT cameras 115, IoT thermostats 120, IoT door locks 125, and/or any other Internet connected device, such as a mobile device, including, but not limited to, a laptop and/or a mobile phone, one or more voice or chat bots, a computer device, including, but not limited to, a desktop computer and/or a router, and/or a home controller 135. In at least one embodiment, the home controller 135 is in wired or wireless communication the one or more devices 110 in the home 130. In some embodiments, the home controller 135 may be a router or Wi-Fi providing device in the home 130. In other embodiments, the home controller 135 is a smart home controller that controls one or more of the devices 110 and may provide communication between the user and the individual devices 110.

In at least one embodiment, each device 110 includes a plurality of settings, attributes, parameters, and/or configurations that allow the device 110 to operate in different ways and provide different operations to the user. These settings, attributes, parameters, and/or configurations may be set, modified, and/or changed by the user. The user may be the homeowner and/or the owner of the individual devices 110. These settings, attributes, parameters, and/or configurations may relate to the security of the device 110, how the device 110 behaves in different situations, who may access the device 110, who may make changes to the device 110 and its settings, attributes, parameters, and/or configurations, and/or other options related to the device 110.

Some of these settings, attributes, parameters, and/or configurations may provide more security and/or safety as to how the device 110 is used. For example, a smart oven with an automatic shutoff after 4 hours may be considered more safe than a smart oven with an automatic shutoff set at 12 hours.

In another example, an IoT door lock 125 that has only one connected device to unlock it would be more secure than an IoT door lock 125 with multiple connected devices that can unlock it. In a further example, a home controller 135 that is configured to communicate using the wired equivalent privacy (WEP) encryption protocol would be considered less safe and secure than using Wi-Fi Protected Access (WPA) encryption protocol, or the Wi-Fi Protected Access Version 2 (WPA2) encryption protocol. In another example, an IoT device 110 that requires two-factor authentication before changing settings would be more secure and safe than one that only requires a password and/or one that allows anyone on the network to access and make changes to the device 110.

In at least one embodiment, the manufacturer 105 may provide one or more software and/or firmware updates for the devices 110. The software and/or firmware updates may provide additional modes, options, and/or configurations to the devices. In some of these embodiments, the device 110 is registered with the manufacturer 105 and the manufacturer 105 uses a website to push the update to the device 110, where the update is automatically applied to the device 110. In other embodiments, the device 110 requests any updates from the website of the manufacturer 105, such as on a periodic basis or when prompted to by the user. These two styles of updates may be considered "over-the-air" updates. In a third embodiment, a user may download the update from a website associated with the manufacturer 105 and apply the update to the device 110.

In the exemplary embodiment, vehicles 140 may also have software that is executed by one or more vehicle controllers 145 in the vehicle 140. The vehicle controller 145 may control various operations of the vehicle 140, including, but not limited to, infotainment and/or vehicle operation. In some embodiments, the vehicle controller 145 is in communication with and/or is a part of the car area network (CAN) bus. The CAN bus provides commands to various devices that operate different portions of the vehicle 140. These devices may control breaking, acceleration, turning, fuel economy, suspension, and/or other operations of the vehicle 140.

In this embodiment, the vehicle controller 145 may be provided with "over-the-air" updates to the software for the vehicle controller 145 itself and the other operational devices in the vehicle 140. For example, one update to the vehicle 140 may change the braking profile of the vehicle 140 to cause it to change how the brakes are applied in different situations. This software may also allow the user to have different profiles for operation of the vehicle 140. For example, the vehicle 140 may have a sport operation mode, a towing operation mode, a comfort operation mode, and/or a safety operation mode. Each operation mode may change one or more parameters of the vehicle 140 and how the vehicle 140 operates. For example, the sports mode may have an increased acceleration where the vehicle 140 accelerates faster when the driver presses the gas pedal or when the vehicle controller 145 controls the vehicle 140.

In the exemplary embodiment, the updates to the devices 110 and the vehicles 140 may be tracked by an update monitor (UM) computer device 150. In some embodiments, the UM computer device 150 may be in communication with the devices 110 and/or the vehicles 140. In further embodiments, the UM computer device 150 may be in communication with one or more websites associated with the manufacturer 105. Through these communications, the UM computer device 150 may determine which version of the software, firmware, and/or updates have been applied to the devices 110 and/or vehicles 140. The UM computer device 150 may also determine which parameters, attributes, settings, options, modes, and/or preferences have been set and to what.

In some of these embodiments, the devices 110 and/or vehicles 140 are configured to transmit their current update versions and settings to the UM computer device 150. In other embodiments, the UM computer device 150 transmits a request to the devices 110 and/or vehicles 140 to request the update and setting information.

In still further embodiments, the manufacturer 105 may have a website and/or application that facilitates the user interactions with the devices 110 and/or vehicle 140. The manufacturer's website and/or application may track the update versions and/or settings applied to the devices 110 and/or vehicle 140 and report those versions and settings to the UM computer device. 150.

In some embodiments, the UM computer device 150 receives the updates for the devices 110 and/or the vehicles 140 from the manufacturer 105 and provides those updates to the devices 110 and/or vehicles 140 to ensure the devices 110 and/or the vehicles 140 are up to date.

Exemplary Computer Network

Figure 2:
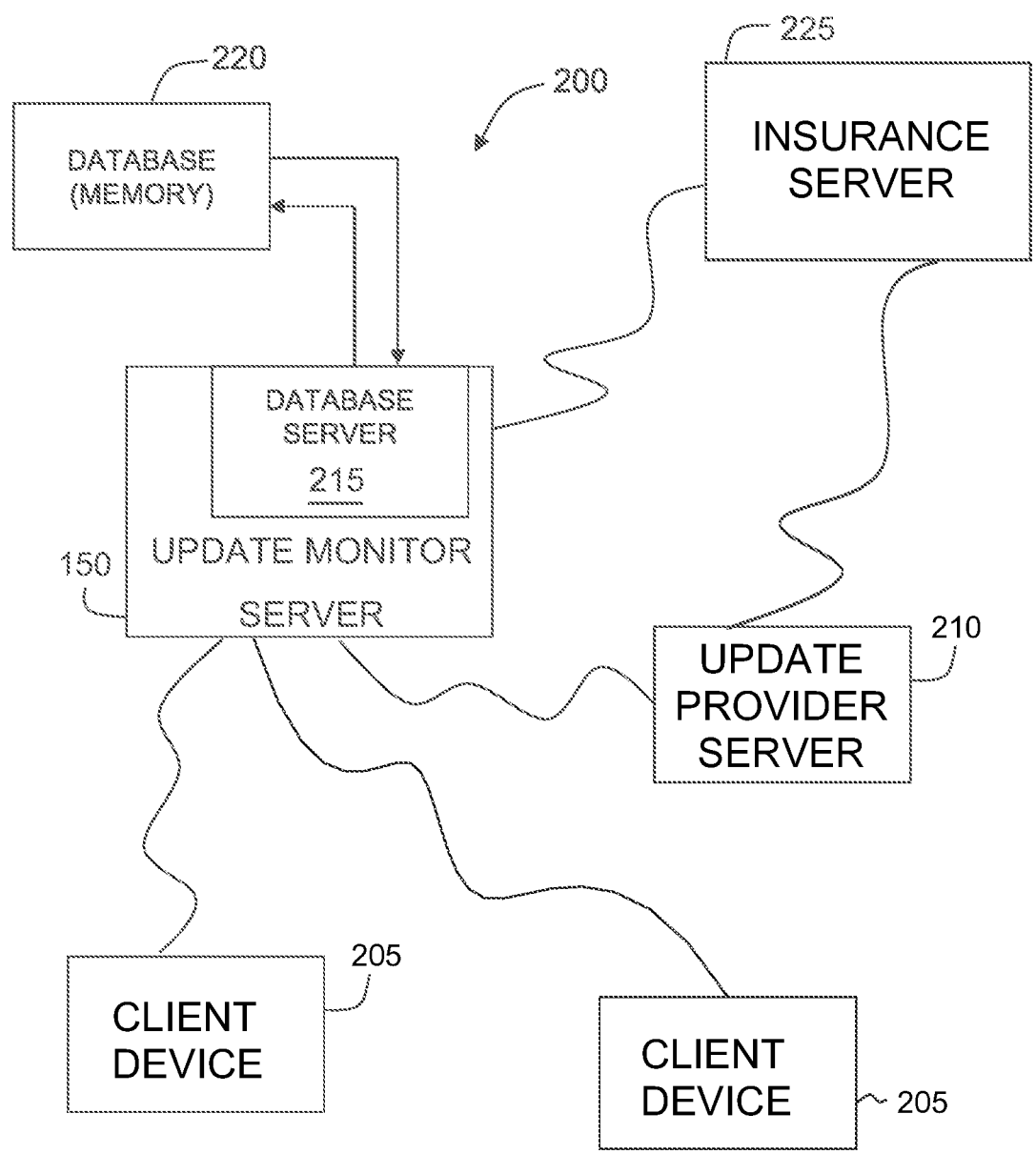
FIG. 2 depicts a simplified block diagram of an exemplary computer system for monitoring and controlling over-the-air updates for devices in accordance with the system shown in FIG. 1.

FIG. 2 depicts a simplified block diagram of an exemplary computer system 200 for monitoring and controlling over-the-air updates for devices in accordance with the system 100 shown in FIG. 1. In the exemplary embodiment, system 200 may be used for monitoring devices 110 and/or vehicles 140 (both shown in FIG. 1) and updating their systems as needed. As described below in more detail, update monitor (UM) server 150 may be configured to (1) store a plurality of version and setting information for plurality of devices 205; (2) receive version and setting information for the first device 205 of the plurality of devices 205; (3) store the version and setting information for the first device 205; (4) determine a risk profile for the first device 205 based upon the corresponding version and setting information; and/or (5) determine an insurance quote based upon the risk profile for the first device 205.

In the exemplary embodiment, client devices 205 are computers that include a web browser or a software application, which enables client devices 205 to access UM server 150 using the Internet. More specifically, client devices 205 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client devices 205 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), voice bots, chat bots, or other web-based connectable equipment or mobile devices. In some embodiments, client devices 205 include devices 110, including IoT devices, and/or vehicles 140.

A database server 215 may be communicatively coupled to a database 220 that stores data. In one embodiment, database 220 may include update files, version information, parameters, attributes, settings, options, modes, and/or preferences. In the exemplary embodiment, database 220 may be stored remotely from UM server 150. In some embodiments, database 220 may be decentralized. In the exemplary embodiment, a person may access database 220 via client devices 205 by logging onto UM server 150, as described herein.

UM server 150 may be communicatively coupled with one or more the client devices 205. In some embodiments, UM server 210 may be associated with, or is part of a computer network associated with insurance, or in communication with the insurance' computer network, such as insurance server 225. In other embodiments, UM server 150 may be associated with a third party and is merely in communication with the insurance' computer network. In at least one embodiment, the UM server 150 is in communication with a plurality of client devices 205. In some embodiments, the UM server 150 request version and setting information from the client devices 205. In other embodiments, the UM server 150 provides the updates to the client devices 205.

One or more update provider servers 210 may be communicatively coupled with the UM server 150. The one or more update provider servers 210 each may be associated with a manufacturer 105 (shown in FIG. 1). The update provider servers 210 may provide tools and/or applications for users to access their associated client devices 205 over the Internet. In some embodiments, the update provider server 210 may be configured to provide updates to the software and/or firmware directly to the client devices 205. In other embodiments, the update provider server 210 provides the updates to the UM server 150, which then updates the corresponding client devices 205.

In one or more embodiments, the UM server 150 is in communication with one or more insurance servers 225. The insurance servers 225 may provide insurance to the users of the client devices 205, devices 110, and/or vehicles 140. The insurance servers 225 may receive the version and setting information from the UM server 150 for the variously insured devices 205. The insurance server 225 may also set insurance values and/or premiums on those devices 205 based upon the versions and/or setting information. Furthermore, in some embodiments, the insurance server 225 may receive periodic setting and version information from the UM server 150 and make adjustments to the corresponding insurance based upon the provided information. In some embodiments, the insurance server 225 may request the current version and setting information for one or more client devices 205. In other embodiments, the insurance server 225 may provide one or more suggestions for settings to the user to improve their insurance rates. In at least one embodiment, the insurance server 225 may provide a monthly report on the insurance rates to the user based upon their version and setting information for their covered client devices 205.

Figure 3:
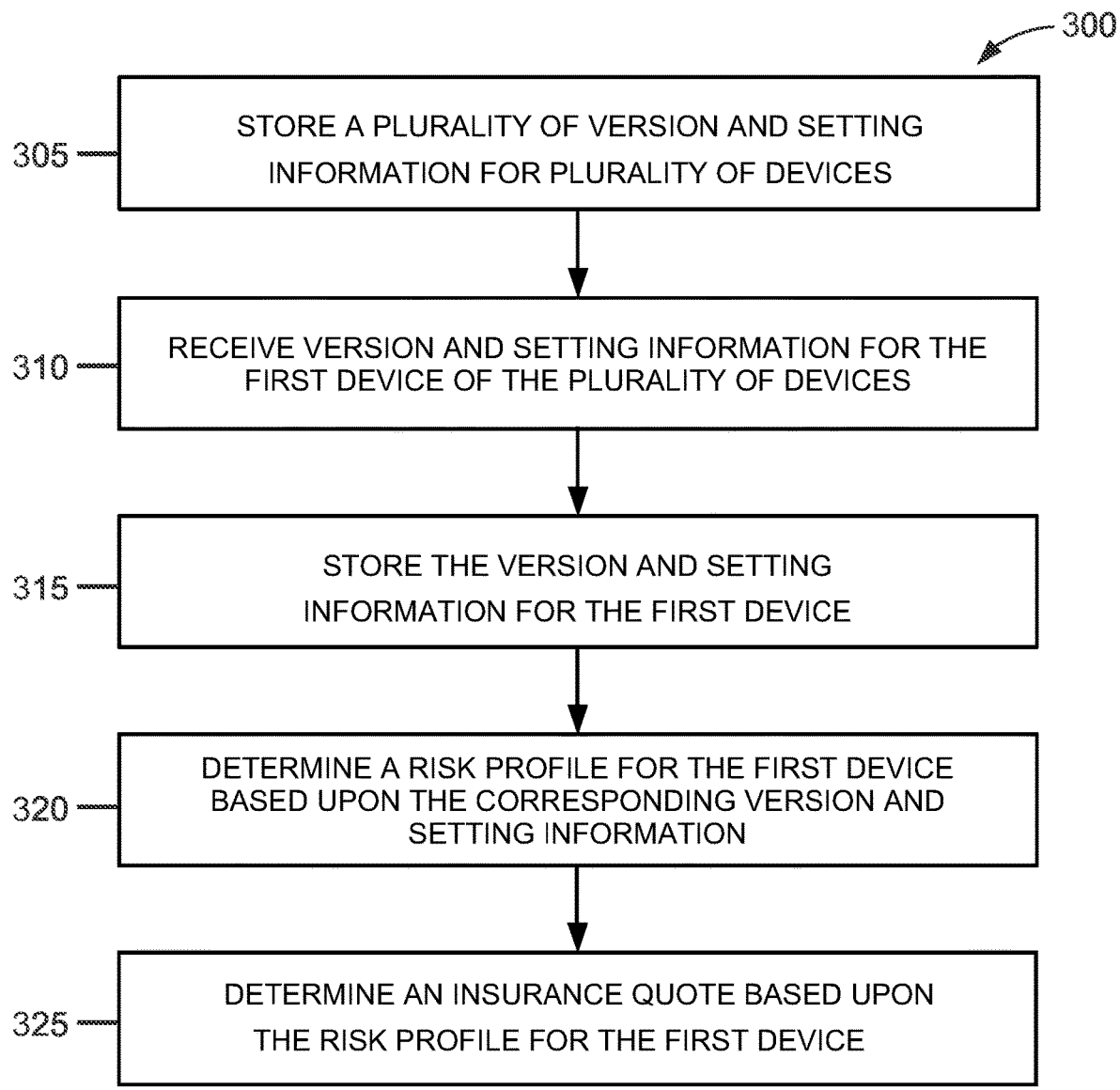
FIG. 3 depicts a flow chart of an exemplary computer-implemented process for monitoring and updating client devices using the systems shown in FIGS. 1 & 2.

Exemplary Computer-Implemented Method for Monitoring and Updating Client Devices FIG. 3 depicts a flow chart of an exemplary computer-implemented process 300 for monitoring and controlling over-the-air updates for client devices using the systems 100 and 200 shown in FIGS. 1 & 2. Process 300 may be implemented by a computing device, for example update monitoring ("UM") server 150 (shown in FIG. 1). In the exemplary embodiment, UM server 150 may be in communication with one or more client devices 205 and one or more update providers 210 (both shown in FIG. 2).

In the exemplary embodiment, the UM server 150 stores 305 a plurality of version and setting information for plurality of devices 110 (shown in FIG. 1). The UM server 150 may store 305 version and setting information for Internet of Thing (IoT) devices 110, vehicles 140 (shown in FIG. 1), and/or other devices 110. In at least one embodiment, the plurality of devices 110 are insured. In at least one embodiment, the UM server 150 stores 305 the plurality of version and setting information in one or more databases 220 (shown in FIG. 2). In some embodiments, the database 220 may be associated with an insurance provider.

In some embodiments, the version and setting information may include one or more cybersecurity settings of the first device 205. The one or more cybersecurity settings may include, but are not limited to, software, firmware, and/or driver versions. The one or more cybersecurity settings may also include, but are not limited to, firewall settings, whitelists, blacklists, port settings, scanning settings, and/or any other cybersecurity settings as desired.

When the first device is a vehicle 140, the version and setting information includes information for at least one of a braking profile of the vehicle 140 and an acceleration profile of the vehicle 140. In some embodiments, the braking profile and/or the acceleration profile of the vehicle 140 is based upon a mode and/or one or more settings. For example, the vehicle 140 may be set in a sport mode with a faster acceleration profile or in a comfort mode with a slow acceleration profile.

In the exemplary embodiment, the UM server 150 receives 310 version and setting information for a first device 205 of the plurality of devices 110. In some embodiments, the first device 205 may be a new device 110 for the UM server 150. In other embodiments, the first device 205 may be new device 110 to be insured.

In the exemplary embodiment, the UM server 150 stores 315 the version and setting information for the first device 205.

In the exemplary embodiment, the UM server 150 determines 320 a risk profile for the first device 205 based upon the corresponding version and setting information. In at least some embodiments, the risk profile may be determined 320 by the insurance server 225 and provided to the UM server 150. In additional embodiments, the risk profile represents an overall riskiness or probability of an insurance claim being made based upon the versions, parameters, attributes, settings, options, modes, and/or preferences associated with the first device 205.

In some embodiments, the UM server 150 may include one or machine learning based models to determine 320 the risk profile for the current version and setting information of the first device based upon historical information about the first device 205. In some of these embodiments, some or all of the historical information may be provided by one or more insurance servers 225. In other embodiments, the UM server 150 may provide the version and update information to the insurance server 225, wherein the insurance server 225 includes one or machine learning based models to determine 320 the risk profile for the current version and setting information of the first device based upon historical information about the first device 205.

In some embodiments, the first device is in a home 130 with other devices 110. In these embodiments, the risk profile may be based upon a plurality of version and setting information for a plurality of devices 110 in the home 130.

In the exemplary embodiment, the UM server 150 may determine 325 an insurance quote based upon the risk profile for the first device 205. In other embodiments, the UM server 150 may generate an insurance policy for the first device 205 based upon the risk profile.

In some embodiments, the UM server 150 may determine that a more recent version is available for the first device 205. The more recent version may be one or more of software, firmware, and/or drivers. In some embodiments, the UM server 150 may transmit a message to a user of the first device 205 to inform the user about the more recent version. In further embodiments, the UM server 150 may transmit the more recent version to the first device 205. In these embodiments, the first device 205 may be configured to install the more recent version.

In some embodiments, the UM server 150 may receive an update to the version and setting information for the first device 205. The UM server 150 may update the risk profile for the first device 205 based upon the updated version and setting information. The UM server 150 may then determine an updated insurance quote based upon the updated risk profile for the first device 205. In some of these embodiments, the update to the version and setting information includes a change to a single setting. In additional embodiments, the UM server 150 receives the update in response to a request to the first device 205. In other embodiments, the UM server 150 receives the update to the version and setting information on a periodic basis.

In some embodiments, the UM server 150 determines an insurance policy associated with the first device 205. Then the UM server 150 updates the insurance policy associated with the first device 205 based upon the version and setting information. The UM server 150 may update the insurance policy based upon the risk profile.

In a further embodiment, the UM server 150 may compare the risk profile to a predetermined lower risk profile. The predetermined lower risk profile may be provided by the insurance server 225. The UM server 150 may determine a difference in price between the risk profile and the predetermined lower risk profile. The UM server 150 may transmit a notification of the difference in price to a user of the first device 205. The UM server 150 may update one or more settings for the first device 205 based upon the predetermined lower risk profile. The UM server 150 may also instruct the first device 205 to update a version of at least one of software and firmware associated with the first device 205 based upon the predetermined lower risk profile.

Figure 4:
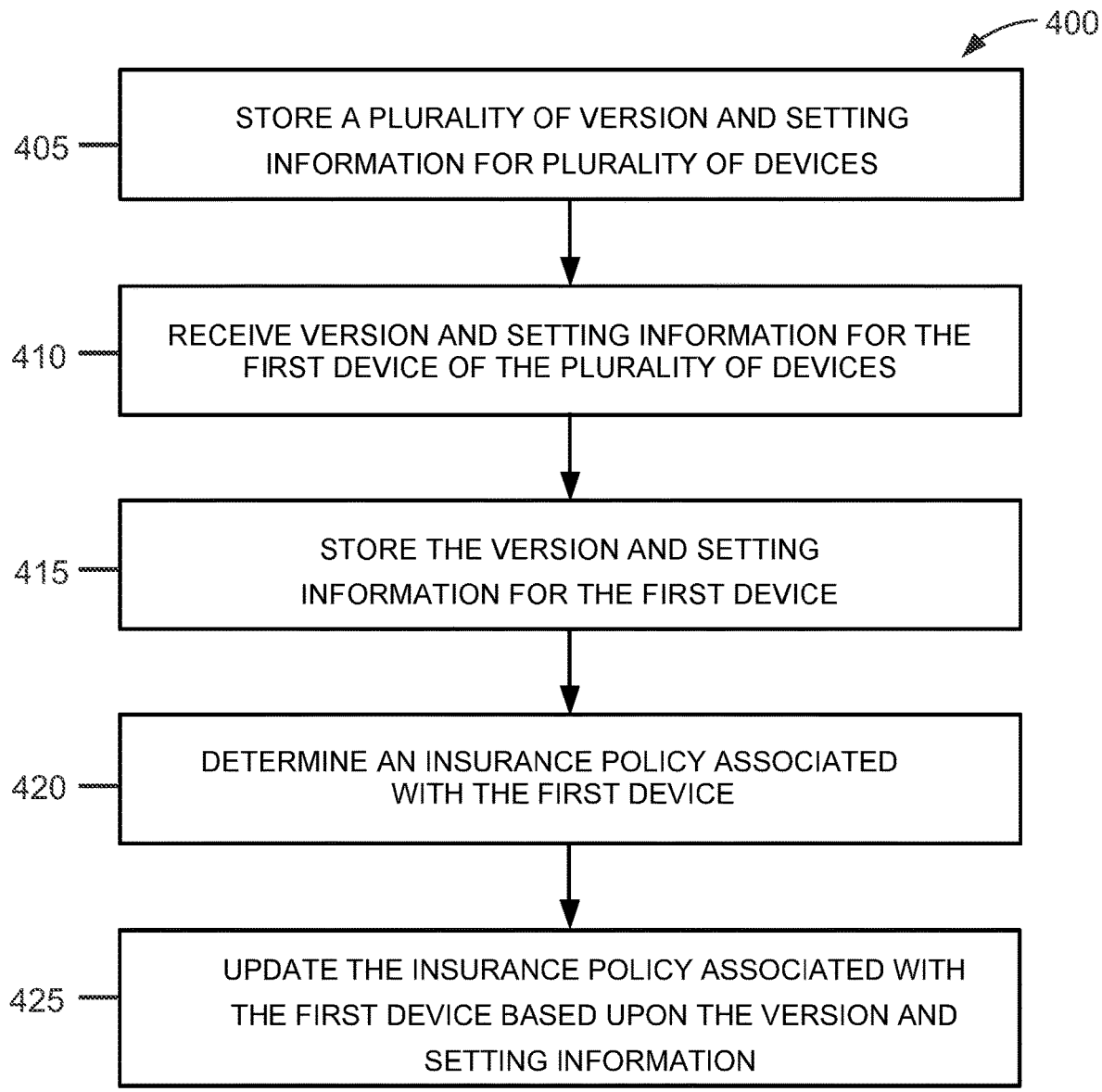
FIG. 4 depicts a flow chart of another exemplary computer-implemented process for monitoring and controlling over-the-air updates for client devices using the systems shown in FIGS. 1 & 2.

Exemplary Computer-Implemented Method for Monitoring and Updating Client Devices FIG. 4 depicts a flow chart of another exemplary computer-implemented process 400 for monitoring and controlling over-the-air updates for client devices using the systems 100 and 200 shown in FIGS. 1 & 2. Process 400 may be implemented by a computing device, for example update monitoring ("UM") server 150 (shown in FIG. 1). In the exemplary embodiment, UM server 150 may be in communication with one or more client devices 205 and one or more update providers 210 (both shown in FIG. 2).

In the exemplary embodiment, the UM server 150 stores 405 a plurality of version and setting information for plurality of devices 110 (shown in FIG. 1). The UM server 150 may store 405 version and setting information for Internet of Thing (IoT) devices 110, vehicles 140 (shown in FIG. 1), and/or other devices 110. In at least one embodiment, the plurality of devices 110 are insured. In at least one embodiment, the UM server 150 stores 305 the plurality of version and setting information in one or more databases 220 (shown in FIG. 2). In some embodiments, the database 220 may be associated with an insurance provider.

In some embodiments, the version and setting information may include one or more cybersecurity settings of the first device 205. The one or more cybersecurity settings may include, but are not limited to, software, firmware, and/or driver versions. The one or more cybersecurity settings may also include, but are not limited to, firewall settings, whitelists, blacklists, port settings, scanning settings, and/or any other cybersecurity settings as desired.

When the first device is a vehicle 140, the version and setting information includes information for at least one of a braking profile of the vehicle 140 and an acceleration profile of the vehicle 140. In some embodiments, the braking profile and/or the acceleration profile of the vehicle 140 is based upon a mode and/or one or more settings. For example, the vehicle 140 may be set in a sport mode with a faster acceleration profile or in a comfort mode with a slow acceleration profile.

In the exemplary embodiment, the UM server 150 receives 410 version and setting information for a first device 205 of the plurality of devices 110. In some embodiments, the first device 205 may be a new device 110 for the UM server 150. In other embodiments, the first device 205 may be new device 110 to be insured. In other embodiments, the first device 205 has been previously analyzed and stored by the UM server 150. In additional embodiments, the first device 205 is associated with an existing insurance policy.

In the exemplary embodiment, the UM server 150 stores 415 the version and setting information for the first device 205.

In the exemplary embodiment, the UM server 150 determines 420 an insurance policy associated with the first device 205. In some embodiments, the UM server 150 transmits the version and setting information to the insurance server 225, where the insurance server 225 determines 420 the insurance policy. In some embodiments, the UM server 150 identifies the first devices 205 based upon one or more pieces of information in the version and setting information, such as a serial number or other device identifier. In these embodiments, the UM server 150 looks up the first device 205 in the database 220 and/or requests information about the first device 205 from the insurance server 225.

In the exemplary embodiment, the UM server 150 may determine 425 update the insurance policy associated with the first device 205 based upon the version and setting information.

In some embodiments, the UM server 150 stores a risk profile for the first device 205 based upon the previous version and setting information. The UM server 150 may updates the risk profile for the first device 205 based upon the received version and setting information. The UM server 150 may update the insurance policy based upon the updated risk profile. In at least some embodiments, the risk profile may be determined 320 by the insurance server 225 and provided to the UM server 150. In additional embodiments, the risk profile represents an overall riskiness or probability of an insurance claim being made based upon the versions, parameters, attributes, settings, options, modes, and/or preferences associated with the first device 205.

In some embodiments, the UM server 150 may include one or machine learning based models to determine 320 the risk profile for the current version and setting information of the first device based upon historical information about the first device 205. In some of these embodiments, some or all of the historical information may be provided by one or more insurance servers 225. In other embodiments, the UM server 150 may provide the version and update information to the insurance server 225, wherein the insurance server 225 includes one or machine learning based models to determine 320 the risk profile for the current version and setting information of the first device based upon historical information about the first device 205.

In some embodiments, the UM server 150 may determine that a more recent version is available for the first device 205. The more recent version may be one or more of software, firmware, and/or drivers. In some embodiments, the UM server 150 may transmit a message to a user of the first device 205 to inform the user about the more recent version. In further embodiments, the UM server 150 may transmit the more recent version to the first device 205. In these embodiments, the first device 205 may be configured to install the more recent version.

In some embodiments, the UM server 150 may receive an update to the version and setting information for the first device 205. The UM server 150 may update the risk profile for the first device 205 based upon the updated version and setting information. The UM server 150 may then determine an updated insurance quote based upon the updated risk profile for the first device 205. In some of these embodiments, the update to the version and setting information includes a change to a single setting. In additional embodiments, the UM server 150 receives the update in response to a request to the first device 205. In other embodiments, the UM server 150 receives the update to the version and setting information on a periodic basis.

Figure 5:
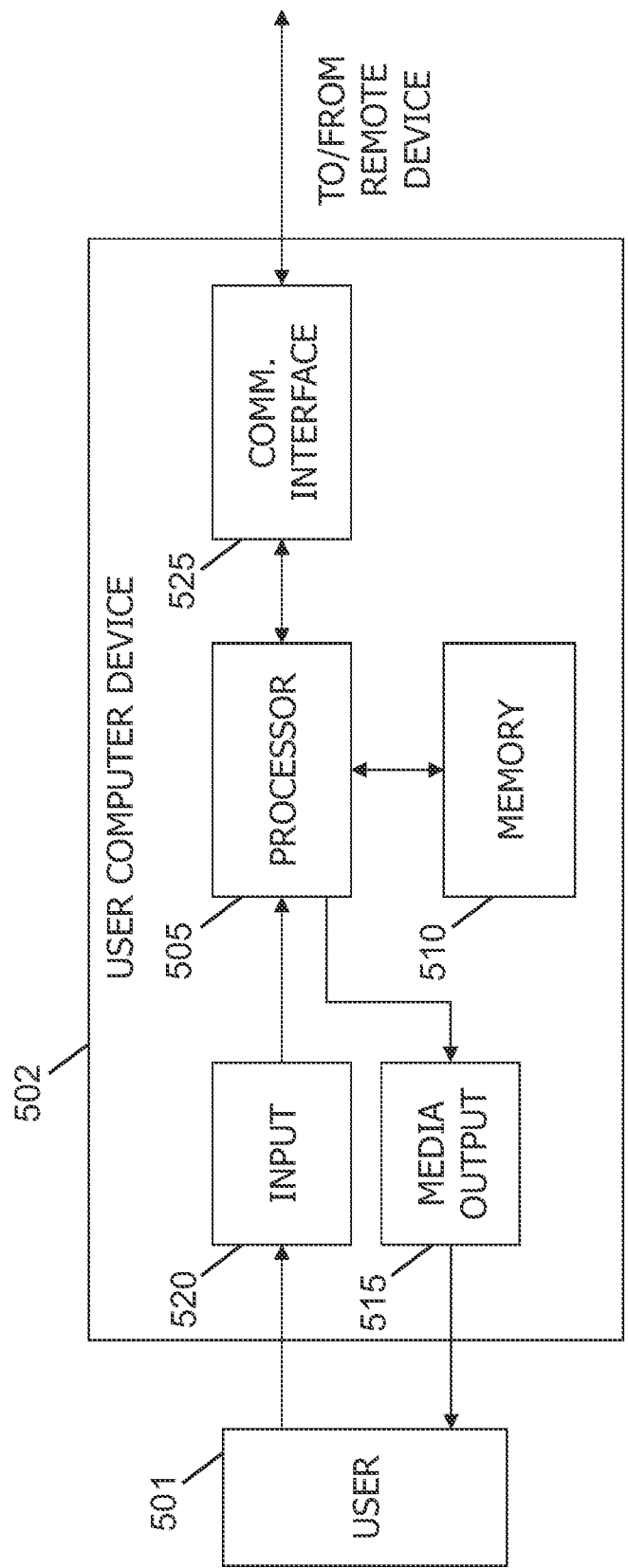
FIG. 5 illustrates an exemplary configuration of a client computer device shown in FIG. 2, in accordance with one embodiment of the present disclosure.

In some embodiments, the first device is in a home 130 with other devices 110. In these embodiments, the insurance policy may be based upon a plurality of version and setting information for a plurality of devices 110 in the home 130.
Exemplary Client Device FIG. 5 depicts an exemplary configuration of a client computer device shown in FIG. 2, in accordance with one embodiment of the present disclosure. User computer device 502 may be operated by a user 501. User computer device 502 may include, but is not limited to, devices 110, IoT camera 115, IoT thermostat 120, IoT door lock 125, vehicle controller 145 (all shown in FIG. 1), client devices 205 (shown in FIG. 2), sensors 805, vehicle controller 810, and mobile device 825 (all shown in FIG. 8). User computer device 502 may include a processor 505 for executing instructions. In some embodiments, executable instructions are stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display), an audio output device (e.g., a speaker or headphones), virtual headsets (e.g., AR (Augmented Reality), VR (Virtual Reality), or XR (eXtended Reality) headsets), and/or voice or chat bots.

In some embodiments, media output component 515 may be configured to present a graphical user interface (e.g., a web browser and/or a client application) to user 501. A graphical user interface may include, for example, an online setting interface for controlling parameters, attributes, settings, options, modes, and/or preferences, including version and/or setting information. In some embodiments, user computer device 502 may include an input device 520 for receiving input from user 501. User 501 may use input device 520 to, without limitation, select and/or enter one or more setting to change and/or an update to apply to a client device 205.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as the UM server 150 (shown in FIG. 1) and/or the update provider server 210 (shown in FIG. 2). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from the UM server 150 and/or the update provider server 210. A client application allows user 501 to interact with, for example, the UM server 150 and/or the update provider server 210. For example, instructions may be stored by a cloud service, and the output of the execution of the instructions sent to the media output component 515.

Processor 505 executes computer-executable instructions for implementing aspects of the disclosure. In some embodiments, the processor 505 is transformed into a special purpose microprocessor by executing computer-executable instructions or by otherwise being programmed.

Exemplary Server Device

Figure 6:
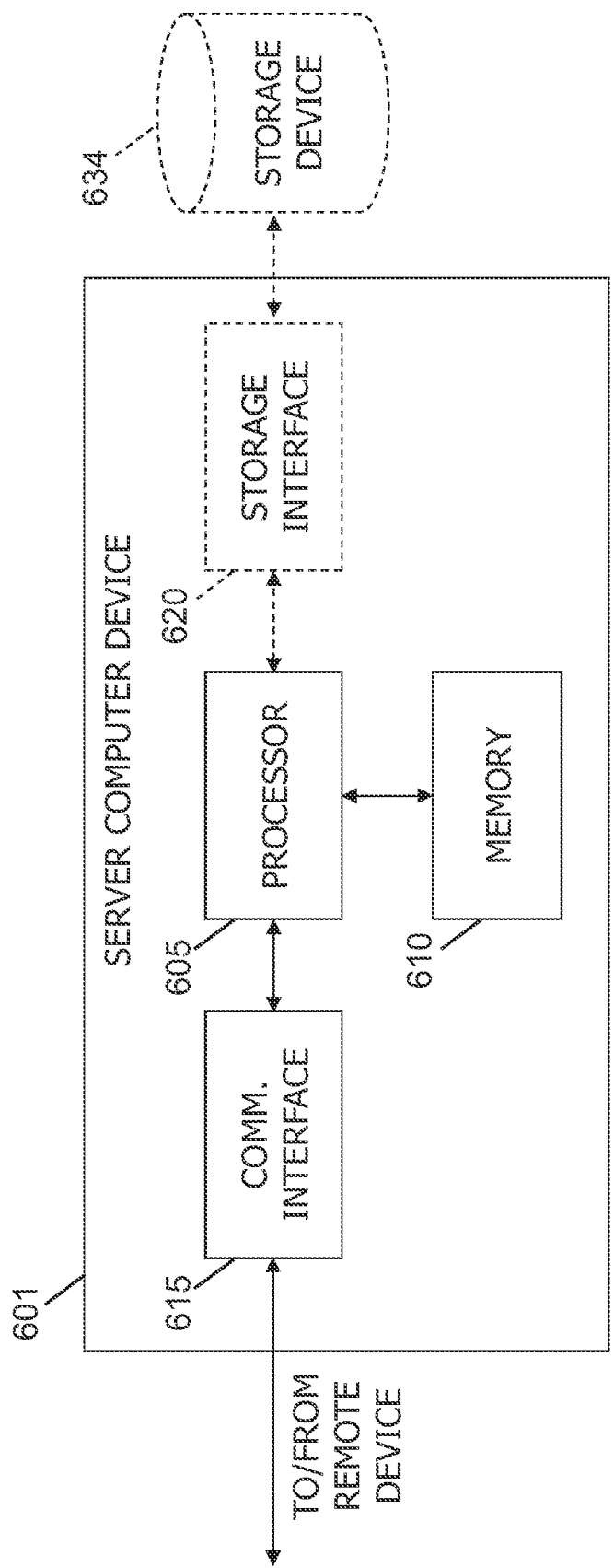
FIG. 6 illustrates an exemplary configuration of a server shown in FIG. 2, in accordance with one embodiment of the present disclosure.

FIG. 6 depicts an exemplary configuration of a server 210 shown in FIG. 2, in accordance with one embodiment of the present disclosure. Server computer device 601 may include, but is not limited to, UM server 150, update provider server 210, database server 215, insurance server 225 (all shown in FIG. 2), vehicle controller 810, and mobile device 825 (both shown in FIG. 8). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, insurance server 225, or client devices 205 (shown in FIG. 2). For example, communication interface 615 may receive requests from client devices 205 via the Internet, as illustrated in FIG. 2.

Processor 605 may also be operatively coupled to a storage device 634. Storage device 634 may be any computer-operated hardware suitable for storing and/or retrieving data, such as, but not limited to, data associated with database 220 (shown in FIG. 2). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instructions such as illustrated in FIGS. 3 and 4.

Exemplary Over the Air System

Figure 7A:
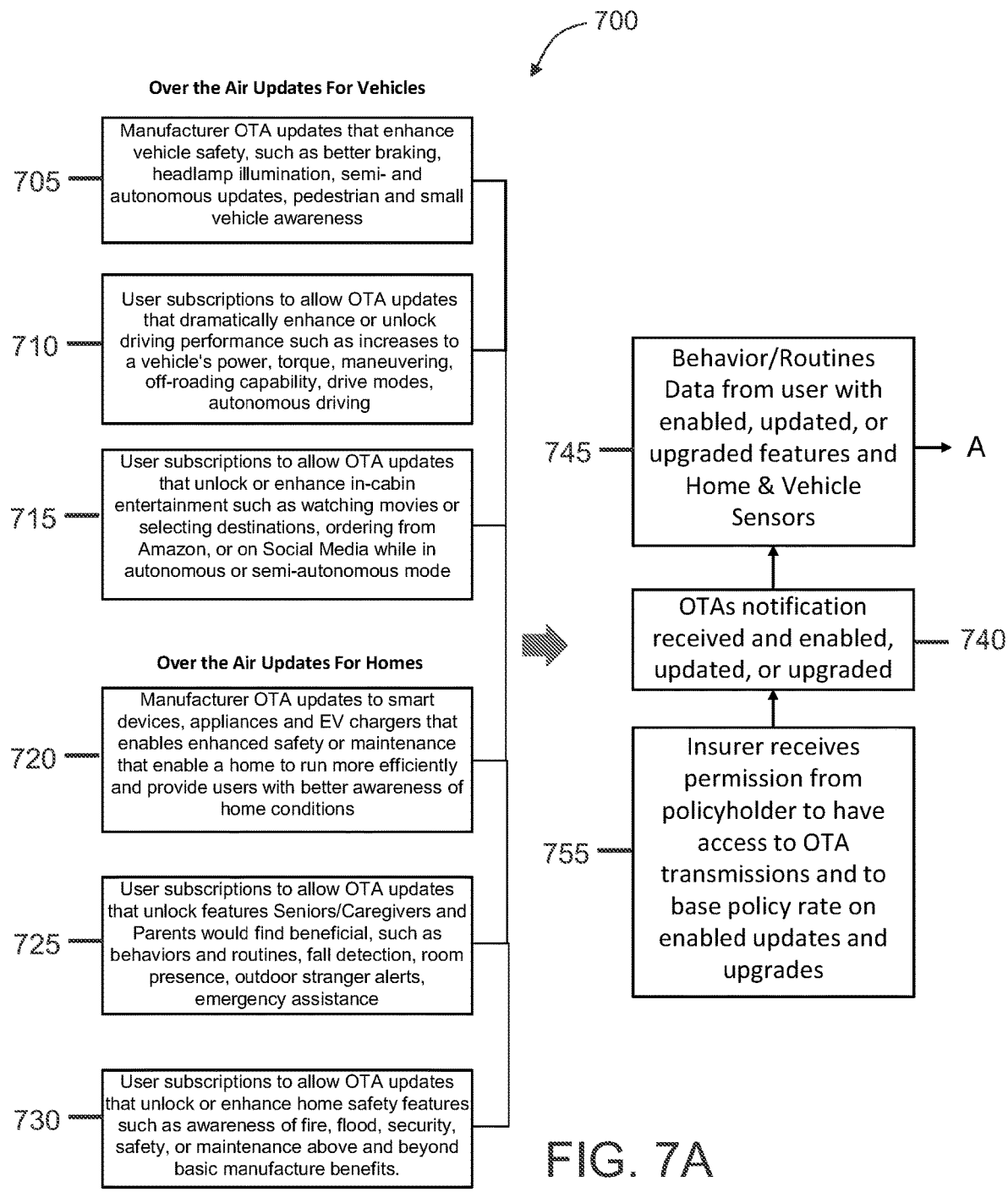
FIGS. 7A and 7B illustrates a diagram of an exemplary computer system for over the air updates and automated premium adjustments for vehicles and home that may be used with the processes shown in FIGS. 3 and 4.
Figure 7B:
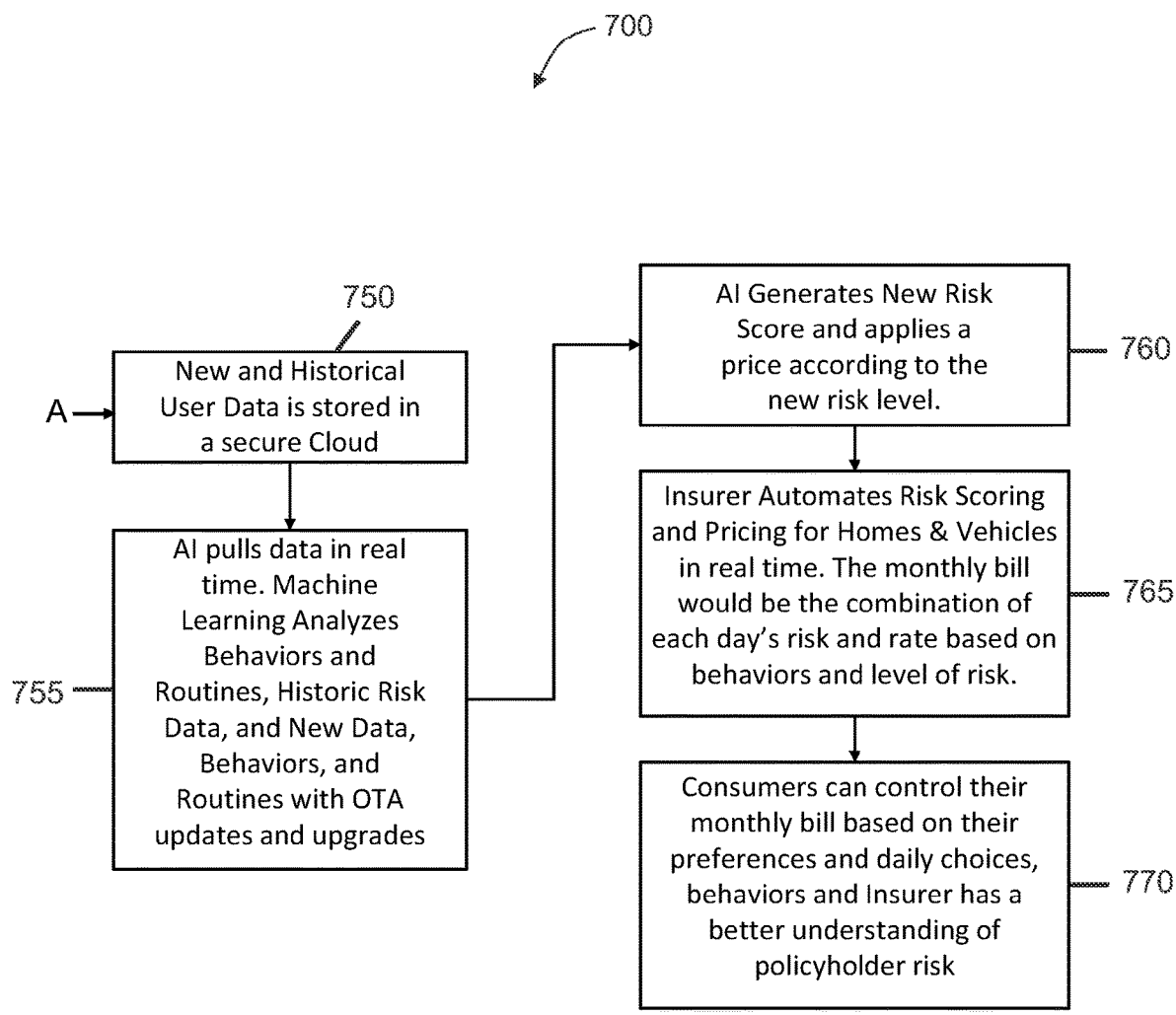

FIGS. 7A and 7B illustrate a diagram of a system 700 for over the air updates and automated premium adjustments for vehicles and homes. System 700 that may be used with the processes shown in FIGS. 3 and 4. The system 700 includes over the air updates for vehicles and homes.

In the over the air (OTA) updates for vehicles, the manufacturer 105 uses 705 OTA for updates that modify the operation of the vehicle to enhance vehicle safety, such as better braking, headlamp illumination, semi- and autonomous updates, pedestrian, and small vehicle awareness. The manufacturer 105 (or others) may provide 710 user subscriptions to allow OTA updates that dramatically enhance the vehicle or unlock driving performance for the vehicle such as increases to a vehicle's power, torque, maneuvering, off-roading capability, drive modes, autonomous driving, etc. The user subscriptions may allow 715 OTA updates that unlock or enhance in-cabin entertainment such as watching movies or selecting destinations, ordering from Amazon, or on Social Media while in autonomous or semi-autonomous mode, In the over the air updates for homes, the manufacturer 105 uses 720 OTA for updates to smart devices, appliances, and EV chargers that enable enhanced safety or maintenance. These updates enable a home to run more efficiently and/or more safely and to provide users with better awareness of home conditions. Manufacturers 105 (or others) may provide 725 user subscriptions to allow OTA updates that unlock or enhance home safety features such as, but not limited to, awareness of fire, flood, security, safety, or maintenance above and beyond the basic manufacture benefits. These user subscriptions may allow 730 OTA updates that unlock features that Seniors/Caregivers and Parents (such as children and caregivers of seniors, parents of young children or teenagers, and/or other family members) would find beneficial, such as behaviors and routines, fall detection, room presence, outdoor stranger alerts, emergency assistance, etc.

In at least one embodiment, the insurance company may 735 receive permission from the policyholder to have access to OTA transmissions for one or more devices 110 and/or vehicles 140 that are covered under insurance policies. In this embodiment, the insurance company may base their policy rate on the policyholder having enabled updates and/or specific upgrades. Furthermore, the insurance company may have access 745 to OTAs notifications to the policyholder, including those updates that have been received, enabled, updated, or upgraded. Furthermore, the insurance company may have access 745 to behavior and/or routine data from user based upon enabled, updated, or upgraded features and sensors in the home and/or vehicle. These behavior and routine data may include, but is not limited to, one or more parameters, attributes, settings, options, modes, and/or preferences.

The system 700 may store 750 new and historical user data, such as in a cloud-based storage. The system 700 may also include an artificial intelligence (AI) that may access 755 data in real-time. The AI uses machine learning to analyze 755 both historical behaviors, routines, and risk data, as well as, new or current behaviors, routines, and risk data, in comparison to OTA updates and upgrades, as well as, one or more parameters, attributes, settings, options, modes, and/or preferences. The AI generates 760 new risk scores/profiles based upon the analysis and applies a price (premium) according to the new risk level.

The insurance company automates 765 risk scoring and pricing for homes and/or vehicles in real-time. In at least one embodiment, the monthly bill would be a combination of each day's risk and rate based upon behaviors and level of risk. Policyholders would be able to control 770 their bill based upon their preferences, daily choices, and behaviors. This also gives the insurance company a better understanding of policyholder risk.

Exemplary Vehicle

Figure 8:
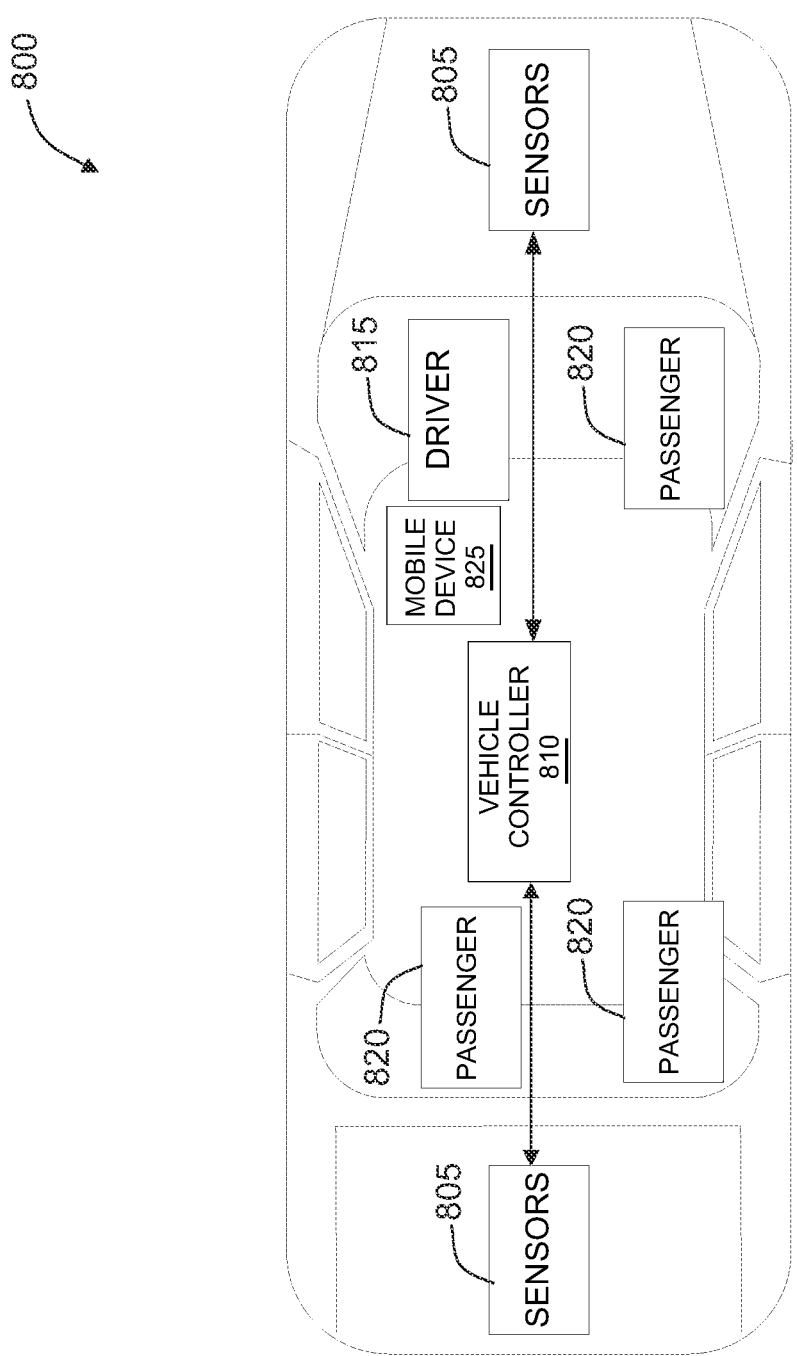
FIG. 8 illustrates a schematic diagram of an exemplary vehicle.

FIG. 8 depicts a view of an exemplary vehicle 800. In some embodiments, vehicle 800 may be an autonomous or semi-autonomous vehicle capable of fulfilling the transportation capabilities of a traditional automobile or other vehicle. In these embodiments, vehicle 800 may be capable of sensing its environment and navigating without human input. In other embodiments, vehicle 800 is a manual vehicle, such as a traditional automobile that is controlled by a driver 815.

Vehicle 800 may include a plurality of sensors 805 and a vehicle controller 810. The plurality of sensors 805 may detect the current surroundings and location of vehicle 800. Plurality of sensors 805 may include, but are not limited to, radar, LIDAR, Global Positioning System (GPS), video devices, imaging devices, cameras, audio recorders, and computer vision. Plurality of sensors 805 may also include sensors that detect conditions of vehicle 800, such as speed, acceleration, gear, braking, and other conditions related to the operation of vehicle 800, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle.

Furthermore, plurality of sensors 805 may include impact sensors that detect impacts to vehicle 800, including force and direction and sensors that detect actions of vehicle 800, such the deployment of airbags. In some embodiments, plurality of sensors 805 may detect the presence of driver 815 and one or more passengers 820 in vehicle 800. In these embodiments, plurality of sensors 805 may detect the presence of fastened seatbelts, the weight in each seat in vehicle 800, heat signatures, or any other method of detecting information about driver 815 and passengers 820 in vehicle 800.

In some embodiments, plurality of sensors 805 may include sensors for determining weight distribution information of vehicle 800. Weight distribution information may include, but is not limited to, the weight and location of remaining gas, luggage, occupants, and/or other components of vehicle 800. In some embodiments, plurality of sensors 805 may include sensors for determining remaining gas, luggage weight, occupant body weight, and/or other weight distribution information. In certain embodiments, plurality of sensors 805 may include occupant position sensors to determine a location and/or position of each occupant (i.e., driver 815 and passengers 820) in vehicle 800. The location of an occupant may identify a particular seat or other location within vehicle 800 where the occupant is located. The position of the occupant may include the occupant's body orientation, the location of specific limbs, and/or other positional information.

In one example, plurality of sensors 805 may include an in-cabin facing camera, LIDAR, radar, weight sensors, accelerometer, gyroscope, compass and/or other types of sensors to identify the location and/or position of occupants within vehicle 800. Vehicle controller 810 and/or another computing device(s) (e.g., mobile device(s)) may be configured to monitor sensor data from plurality of sensors 805 and/or other sensors to determine weight distribution information and/or location and position of the occupants.

In one example, vehicle controller 810 may compare sensor data for a particular event (e.g., a road bump) with historical sensor data to identify the weight distribution of vehicle 800 and/or the location of the occupants of vehicle 800. In another example, plurality of sensors 805 may include weight sensors that vehicle controller 810 monitors to determine the weight distribution information.

Vehicle controller 810 may interpret the sensory information to identify appropriate navigation paths, detect threats, and react to conditions. In some embodiments, vehicle controller 810 may be able to communicate with one or more remote computer devices, such as mobile device 825. In the example embodiment, mobile device 825 is associated with driver 815 and includes one or more internal sensors, such as an accelerometer, a gyroscope, and/or a compass. Mobile device 825 may be capable of communicating with vehicle controller 810 wirelessly. In addition, vehicle controller 810 and mobile device may be configured to communicate with computer devices located remotely from vehicle 800.

In some embodiments, vehicle 800 may include autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with vehicle controller 810.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

While vehicle 800 may be an automobile in the exemplary embodiment, in other embodiments, vehicle 800 may be, but is not limited to, other types of ground craft, aircraft, and watercraft vehicles Exemplary Embodiments & Functionality In one embodiment, a computer system for monitoring and controlling over-the-air updates for a first device may be provided. The computer system may include one or more local or remote processors, transceivers, servers, sensors, memory units, wearables, mobile devices, smart glasses, smart watches, smart contact lenses, augmented reality glasses, virtual reality headsets, mixed reality or extended reality devices, voice bots, chat bots, ChatGPT bots, and/or other electronic or electrical components, which may be in wired or wireless communication with one another. The computer system may (1) store a plurality of version and setting information for plurality of devices; (2) receive version and setting information for the first device of the plurality of devices; (3) store the version and setting information for the first device; (4) determine a risk profile for the first device based upon the corresponding version and setting information; and/or (5) determine an insurance quote based upon the risk profile for the first device. The computer system may be configured to include additional, less, or alternative functionality, including that discussed elsewhere herein.

For instance, in some further enhancements, the version and setting information may include one or more cybersecurity settings of the first device. In additional enhancements, the first device may be an Internet of Thing (IoT) device. In further embodiments, the version and setting information may be based upon at least one of software and firmware of the first device.

In additional enhancements, the computer system may determine that a more recent version is available for the first device. The computer system may transmit a message to a user of the first device to inform the user about the more recent version. The computer system may also transmit the more recent version to the first device, wherein the first device may be configured to install the more recent version.

In some enhancements, the first device may be a vehicle and the version and setting information may include information for at least one of a braking profile of the vehicle and an acceleration profile of the vehicle In additional enhancements, the computer system may receive an update to the version and setting information for the first device. The computer system may also update the risk profile for the first device based upon the updated version and setting information. The computer system may determine an updated insurance quote based upon the updated risk profile for the first device. The update to the version and setting information may include a change to a single setting. The computer system may receive the update in response to a request to the first device. The computer system may further receive the update to the version and setting information on a periodic basis.

In a further enhancement, the computer system may determine an insurance policy associated with the first device. The computer system may update the insurance policy associated with the first device based upon the version and setting information. The computer system may update the insurance policy based upon the risk profile.

In additional enhancements, the first device may be in a home and the risk profile may be based upon a plurality of version and setting information for a plurality of devices in the home.

In a further enhancement, the computer system may compare risk profile to a predetermined lower risk profile. The computer system may determine a difference in price between the risk profile and the predetermined lower risk profile. The computer system may transmit a notification of the difference in price to a user of the first device. The computer system may update one or more settings for the first device based upon the predetermined lower risk profile.

The computer system may also update a version of at least one of software and firmware associated with the first device based upon the predetermined lower risk profile.

In another aspect, a computer-based method for monitoring and controlling over-the-air updates for a first device may be provided. The computer-based method may be implemented via one or more local or remote processors, transceivers, sensors, servers, memory units, mobile devices, wearables, smart glasses, smart watches, smart contact lenses, augmented reality glasses or headsets, virtual reality glasses or headsets, mixed or extended reality devices, voice bots, chat bots, ChatGPT bots, and/or other electronic or electrical components, which may be in wired or wireless communication over one or more radio frequency links with one another. For example, in one instance, the method may be implemented on an update monitoring ("UM") server that includes at least one processor (and/or associated transceiver) in communication with at least one memory device. The method may include, via the at least one processor: (1) storing a plurality of version and setting information for plurality of devices; (2) receiving version and setting information for the first device of the plurality of devices; (3) storing the version and setting information for the first device; (4) determining a risk profile for the first device based upon the corresponding version and setting information; and/or (5) determining an insurance quote based upon the risk profile for the first device. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions cause the processor to: (1) store a plurality of version and setting information for plurality of devices; (2) receive version and setting information for the first device of the plurality of devices; (3) store the version and setting information for the first device; (4) determine a risk profile for the first device based upon the corresponding version and setting information; and/or (5) determine an insurance quote based upon the risk profile for the first device. The computer-executable instructions may direct additional, less, or alternate functionality, including that discussed elsewhere herein.

In one embodiment, a computer system for monitoring and controlling over-the-air updates for a first device may be provided. The computer system may include one or more local or remote processors, transceivers, servers, sensors, memory units, wearables, mobile devices, smart glasses, smart watches, smart contacts, augmented reality glasses, virtual reality headsets, mixed or extended reality devices, voice or chat bots, ChatGPT bots, and/or other electronic or electrical components, which may be in wired or wireless communication with one another. The computer system may (1) receive version and setting information for the first device of the plurality of devices; (2) store the version and setting information for the first device; (3) determine an insurance policy associated with the first device; and/or (4) update the insurance policy based upon the version and setting information for the first device. The computer system may be configured to include additional, less, or alternative functionality, including that discussed elsewhere herein.

For instance, in some further enhancements, the computer system may store a risk profile for the first device based upon the previous version and setting information. The computer system may also update the risk profile for the first device based upon the received version and setting information. The computer system may further update the insurance policy based upon the updated risk profile.

In additional enhancements, the version and setting information may include one or more cybersecurity settings of the first device. The first device may be an Internet of Thing (IoT) device.

In some enhancements, the computer system may determine that a more recent version is available for the first device. The computer system may also transmit a message to a user of the first device to inform the user about the more recent version. The computer system may further transmit the more recent version to the first device, wherein the first device is configured to install the more recent version.

In additional enhancements, the version and setting information may be based upon at least one of software and firmware of the first device. The first device may be a vehicle. The version and setting information may include information for at least one of a braking profile of the vehicle and an acceleration profile of the vehicle.

In some enhancements, the first device may be in a home. The insurance policy may be based upon a plurality of version and setting information for a plurality of devices in the home.

In another aspect, a computer-based method for monitoring and controlling over-the-air updates for a first device may be provided. The computer-based method may be implemented via one or more local or remote processors, transceivers, sensors, servers, memory units, mobile devices, wearables, smart glasses, smart watches, smart contacts, augmented reality glasses, virtual reality headsets, mixed or extended reality devices, voice or chat bots, ChatGPT bots, and/or other electronic or electrical components, which may be in wired or wireless communication with one another. For example, in one instance, the method may be implemented on an update monitoring ("UM") server that includes at least one processor (and/or associated transceiver) in communication with at least one memory device. The method may include, via the at least one processor: (1) storing a plurality of version and setting information for plurality of devices; (2) receiving version and setting information for the first device of the plurality of devices; (3) storing the version and setting information for the first device; (4) determining an insurance policy associated with the first device; and/or (5) updating the insurance policy based upon the version and setting information for the first device. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions cause the processor to: (1) store a plurality of version and setting information for plurality of devices; (2) receive version and setting information for the first device of the plurality of devices; (3) store the version and setting information for the first device; (4) determine an insurance policy associated with the first device; and/or (5) update the insurance policy based upon the version and setting information for the first device. The computer-executable instructions may direct additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and/or reinforced or reinforcement learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant personal belonging and/or home feature information for customers from mobile device sensors, vehicle-mounted sensors, home-mounted sensors, and/or other sensor data, vehicle or home telematics data, image data, and/or other data.

In one embodiment, a processing element may be trained by providing it with a large sample of conventional analog and/or digital, still and/or moving (i.e., video) image data, telematics data, and/or other data of belongings, household goods, durable goods, appliances, electronics, homes, etc. with known characteristics or features. Such information may include, for example, make or manufacturer and model information.

Based upon these analyses, the processing element may learn how to identify characteristics and patterns that may then be applied to analyzing sensor data, vehicle or home telematics data, image data, mobile device data, and/or other data. For example, the processing element may learn, with the customer's permission or affirmative consent, to identify the type and number of goods within the home, and/or purchasing patterns of the customer, such as by analysis of virtual receipts, customer virtual accounts with online or physical retailers, mobile device data, interconnected or smart home data, interconnected or smart vehicle data, etc. For the goods identified, a virtual inventory of personal items or personal articles may be maintained current and up-to-date. As a result, at the time of an event that damages the customer's home or goods, providing prompt and accurate service to the customer may be provided—such as accurate insurance claim handling, and prompt repair or replacement of damaged items for the customer.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an exemplary embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An update monitoring ("UM") computer system for monitoring and controlling over-the-air updates for a first device, the UM computer system comprising at least one processor in communication with at least one memory device, the at least one processor programmed to:
store a plurality of current version and setting information for a plurality of devices, the plurality of devices in communication with at least one manufacturer computing device that is configured to communicate updates relating to version and setting information for each of the plurality of devices, wherein the at least one manufacturer computing device is also in communication with the UM computer system;
receive an update to the current version and setting information for the first device of the plurality of devices, wherein the version and setting information includes a plurality of setting parameters;
store the updated version and setting information for the first device;
determine a current device profile for the first device based upon the current version and setting information, the current device profile representing a current level of safety associated with the first device operating with the current version and setting information:
determine an updated device profile for the first device based upon the received updated version and setting information, the updated device profile representing an updated level of safety associated with the first device operating with the updated version and setting information; and
identify one or more setting parameters of the current version and setting information that could be changed to improve the current level of safety of the first device, based on a comparison of the determined current device profile and the determined updated device profile.

2. The computer system of claim 1, wherein the version and setting information includes one or more cybersecurity settings of the first device.

3. The computer system of claim 1, wherein the first device is an Internet of Thing (IoT) device.

4. The computer system of claim 1, wherein the at least one processor is further programmed to determine that a more recent version is available for the first device.

5. The computer system of claim 4, wherein the at least one processor is further programmed to transmit a message to a user of the first device to inform the user about the more recent version.

6. The computer system of claim 4, wherein the at least one processor is further programmed to transmit the more recent version to the first device, wherein the first device is configured to install the more recent version.

7. The computer system of claim 1, wherein the version and setting information is further based upon at least one of software and firmware of the first device.

8. The computer system of claim 1, wherein the first device is a vehicle.

9. The computer system of claim 8, wherein the version and setting information includes information for at least one of a braking profile of the vehicle and an acceleration profile of the vehicle.

10. The computer system of claim 1, wherein the at least one processor is further programmed to:
determine an updated insurance quote based upon the updated device profile for the first device and the updated level of safety associated with the first device.

11. The computer system of claim 10, wherein the update to the version and setting information includes a change to a single setting of the plurality of setting parameters.

12. The computer system of claim 10, wherein the at least one processor is further programmed to receive the update in response to a request to the first device.

13. The computer system of claim 10, wherein the at least one processor is further programmed to receive the update to the version and setting information on a periodic basis.

14. The computer system of claim 1, wherein the at least one processor is further programmed to update an insurance policy based upon the updated device profile representing the updated level of safety associated with the first device.

15. The computer system of claim 1, wherein the first device is in a home, and wherein the updated device profile is based upon a plurality of version and setting information for a plurality of devices in the home.

16. The computer system of claim 1, wherein the at least one processor is further programmed to:
compare the current device profile to a predetermined device profile;
determine a difference in price between the current device profile and the predetermined device profile; and
transmit a notification of the difference in price to a user of the first device.

17. The computer system of claim 16, wherein the at least one processor is further programmed to update one or more settings for the first device based upon the predetermined device profile.

18. The computer system of claim 16, wherein the at least one processor is further programmed to update a version of at least one of software and firmware associated with the first device based upon the predetermined device profile.

19. A computer-implemented method for monitoring and controlling over-the-air updates for a first device implemented on a computer device comprising at least one processor in communication with at least one memory, the method comprising:
storing a plurality of current version and setting information for a plurality of devices, the plurality of devices in communication with at least one manufacturer computing device that is configured to communicate updates relating to version and setting information for each of the plurality of devices, wherein the at least one manufacturer computing device is also in communication with the computer device;
receiving an update to the current version and setting information for the first device of the plurality of devices, wherein the version and setting information includes a plurality of setting parameters;
storing the updated version and setting information for the first device;
determining a current device profile for the first device based upon the current version and setting information, the current device profile representing a current level of safety associated with the first device operating with the current version and setting information;

determining an updated device profile for the first device based upon the received updated version and setting information, the updated device profile representing an updated level of safety associated with the first device operating with the updated version and setting information; and identifying one or more setting parameters of the current version and setting information that could be changed to improve the current level of safety of the first device, based on a comparison of the determined current device profile and the determined updated device profile.

20. At least one non-transitory computer-readable storage media having computer-executable instructions embodied thereon, wherein when executed by at least one processor, the computer-executable instructions cause the processor to:

store a plurality of current version and setting information for a plurality of devices, the plurality of devices in communication with at least one manufacturer computing device that is configured to communicate updates relating to version and setting information for each of the plurality of devices;

receive an update to the current version and setting information for the first device of the plurality of devices, wherein the version and setting information includes a plurality of setting parameters;

store the updated version and setting information for the first device;

determine a current device profile for the first device based upon the current version and setting information, the current device profile representing a current level of safety associated with the first device operating with the current version and setting information;

determine an updated device profile for the first device based upon the received updated version and setting information, the updated device profile representing an updated level of safety associated with the first device operating with the updated version and setting information; and identify one or more setting parameters of the current version and setting information that could be changed to improve the current level of safety of the first device, based on a comparison of the determined current device profile and the determined updated device profile.

\* \* \* \* \*